United States Patent [19]
Dion

[11] Patent Number: 5,222,762
[45] Date of Patent: Jun. 29, 1993

[54] DOUBLE PIANO HINGE VEHICLE SUSPENSION

[76] Inventor: Fernand Dion, 197, Route 138, Saint-Augustin, Québec, Canada, G3A 1W1

[21] Appl. No.: 977,004

[22] Filed: Nov. 16, 1992

Related U.S. Application Data

[63] Continuation-in-part of Ser. No. 757,816, Sep. 11, 1991, abandoned.

[51] Int. Cl.⁵ ............... B60G 9/02; B60G 11/23; F16F 1/36
[52] U.S. Cl. ............... 280/840; 280/112.1; 267/279; 267/284; 267/285; 267/153
[58] Field of Search ............... 180/41; 280/840, 688, 280/716, 717, 721, 112.1; 267/276, 279, 284, 285, 153, 154

[56] References Cited

U.S. PATENT DOCUMENTS

| | | | |
|---|---|---|---|
| 2,362,483 | 11/1944 | Hickman | 280/717 X |
| 2,542,026 | 2/1951 | Hickman | 267/276 |
| 2,715,022 | 8/1955 | Krotz | 267/281 X |
| 2,770,468 | 11/1956 | Willingham | 280/112.1 |
| 2,784,978 | 3/1957 | Seale | 280/840 |

FOREIGN PATENT DOCUMENTS

| | | | |
|---|---|---|---|
| 2610572 | 8/1988 | France | 280/840 |
| 304607 | 12/1929 | United Kingdom | 280/840 |

Primary Examiner—Margaret A. Focarino
Assistant Examiner—Tamara L. Graysay
Attorney, Agent, or Firm—Pierre Lespérance; Francois Martineau

[57] ABSTRACT

A suspension system for compensating road-borne loads applied selectively to one end of a vehicle wheeled axle. The suspension system includes a pair of elongated rigid tubes, extending longitudinally over opposite sides of the wheel axle, and supported thereover by corresponding upright posts anchored to the intermediate section of the wheel axle. Each post and associated tube have a number of lateral interdigitating hollow ears, wherein the tube and post are pivotally interconnected by a lengthwise rubber shaft. A bottom frame beam from the vehicle body extends laterally outwardly of each corresponding tube, and includes a plurality of ears interdigitating with additional ears from the proximate tube for through engagement by another rubber shaft, for pivotally interconnecting the beam to the tube. In normal condition, each beam ear rubber shaft is downwardly offset relative to the post ear rubber shaft. Thus, as the axle on one side of the vehicle is lifted following a road-borne load, the vehicle beam on that side will sink as well as move inwardly toward the intermediate portion of the axle, due to the deformation of the rubber shafts, whereas the vehicle beam on the opposite side will raise as well as move outwardly away from the intermediate axle portion.

15 Claims, 9 Drawing Sheets

DOUBLE PIANO HINGE VEHICLE SUSPENSION

CROSS-REFERENCE DATA

This is a continuation-in-part application based upon co-pending patent application Ser. No. 07/757,816 filed Sep. 11, 1991, abandoned.

FIELD OF THE INVENTION

This invention relates to suspensions for road-going wheeled vehicles.

BACKGROUND OF THE INVENTION

U.S. Pat. No. 2,715,022 issued in 1955 to Krotz discloses a typical spring suspension system for a vehicle supported over ground by a wheel axle. In this suspension unit attached on either side to the beams of a truck frame, there is provided on each side of the vehicle axle 11 a pair of pivotal rubber torsion connections 21, 36 which extend longitudinally of the vehicle in laterally spaced fashion. Each pair of rubber connections 21, 36 are interconnected by a pivotal arm 29, wherein the arms and the axle have a statically loaded position relative to the vehicle frame in which the arms extend horizontally and the rubber bodies are distorted in radial compression by forces acting in a direction to impart compressive stress in each arm. These arms are movable arcuately to another position at which the distortion of the rubber is relieved.

The stability of the vehicle provided with such a suspension system could be improved. Indeed, in this and other prior art patents, the suspension use solely torsion bars as the spring-loaded suspension system. Such torsion members are deemed by the present inventor to be inefficient.

OBJECTS OF THE INVENTION

The gist of the invention is to improve road-handling of trailer vehicles by providing a double piano-hinge type suspension that maintains the vehicle load stability during inclination of the vehicle wheel axle.

SUMMARY OF THE INVENTION

Accordingly with the teachings of the invention, there is disclosed a suspension member for use in a road-going vehicle of the type having a chassis and a pair of two-wheel axles, said suspension member destined to movingly support said chassis spacedly over said wheel axles and defining: (a) a main, rigid frame, defining one and another opposite sides; (b) first connector means, for pivotally interconnecting said one side of suspension main frame to one portion of said vehicle chassis; (c) second connector means, for pivotally interconnecting said another side of suspension main frame to one portion of at least one of said wheel axles; (d) first resiliency means, cooperating with said first connector means in downwardly biasing said one side of suspension main frame and the associated said chassis one portion relative to said another side of suspension main frame, under the chassis weight load; (e) second resiliency means, cooperating with said second connector means in further downwardly biasing said another side of suspension main frame and the associated said chassis one portion relative to said another side of suspension main frame, under the bias of said first resiliency means; wherein, upon a road-borne load being applied to at least one of the vehicle wheel axles, said suspension main frame will tilt said chassis, from an initial position to a tilted position spacedly over said wheel axles, against the bias of said first and second resiliency means, while upon said road-borne load being released, said suspension main frame will automatically return said chassis to its said initial position under the spring-back bias of said first and second resiliency means.

More particularly, the invention pertains to a suspension system for use in dampening road-borne loads sustained by a vehicle having a chassis overlying a two wheel axle, said chassis defining first and second laterally spaced, lengthwise, horizontal, bottom beams spacedly proximate the corresponding two wheels and located therebetween, said axle defining an intermediate section in between said beams and first and second segments respectively extending between said intermediate axle section and the two wheels, said suspension system defining:

(a) first translational means, responsive to a lifting of said axle first segment and associated wheel for biasing said first beam into a downwardly inwardly directed translational motion;

(b) second translational means, responsive to a lifting of said axle first segment and associated wheel for biasing said second beam into an upwardly outwardly directed translational motion; wherein said vehicle beams remain horizontal during said translational motions.

Preferably, each of said first and second translational means consists of a double piano hinge type assembly including two lengthwise, transversely spaced hinge members (80, 82; or 84, 86) made from deformable material. Advantageously, such a double piano hinge type suspension assembly would consist of a lengthwise rigid frame tube (56, 58), having a plurality of first and second sleeve blocks (60, 62) on first and second opposite sides thereof; a plurality of third sleeve blocks (64), laterally inwardly depending from each vehicle beam, and interdigitating with said first sleeve blocks wherein one of said hinge members extends through said first and third sleeve blocks to pivotally interconnect said tube to the corresponding said beam; a support member (32), anchored to said axle intermediate section (12) and projecting upwardly therefrom; a plurality of fourth sleeve blocks (66), laterally outwardly depending from said support member (32), and interdigitating with said second sleeve blocks wherein the other of said hinge members extend through said second and fourth sleeve blocks to pivotally interconnect said tube to said support member; whereby, in normal road-going condition, said one hinge member is downwardly offset from said other hinge member. Profitably, such a hinge member would be an elongated, lengthwise, elastomeric compressible stud (80, 82, 84, 86). It would then be further desirable that said stud be generally quadrangular in cross-section in its normal condition, and that there be further included a number of spaced annular bulges integral to said stud at successively equally spaced intervals, to maintain a gap in between each pair of successive interdigitated sleeve blocks being engaged therethrough by the stud.

DETAILED DESCRIPTION OF THE INVENTION

Figures 1, 2:
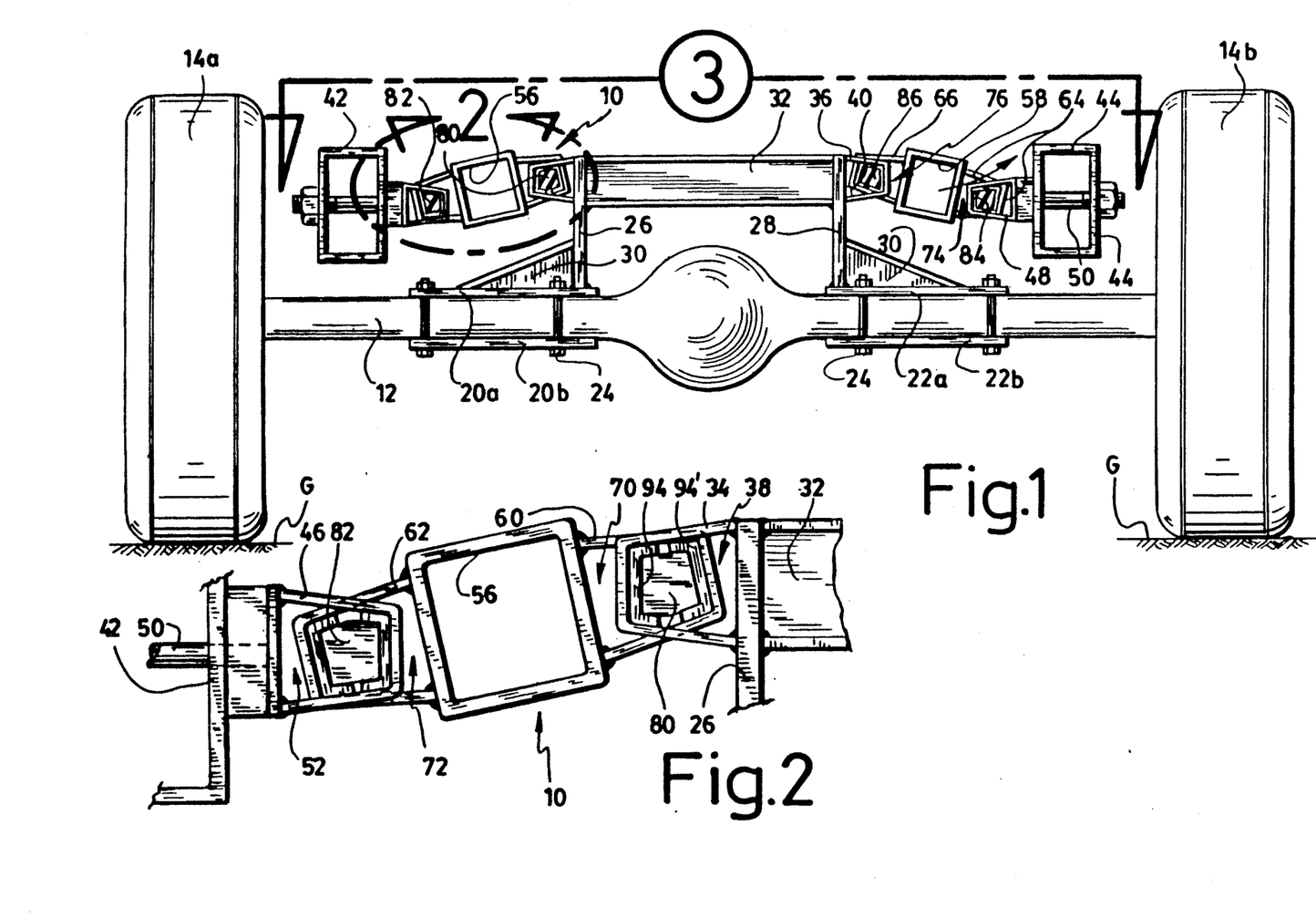
FIG. 1 is a front elevational view of a vehicle axle, supported by two wheels and fitted with a vehicle suspension system according to a preferred embodiment of the invention.
FIG. 2 is an enlargement of area 2 of FIG. 1.

A pair of lengthwisely spaced axles 12, 12' rotatably axially support two opposite pairs of wheels 14a, 14b and 14c, 14d, respectively, over ground in substantially upright position. A tubular frame 16 is mounted over axles 12, 12' to support a vehicle box or the like (not illustrated). Frame 16 is connected to axles 12, 12' by a novel suspension system 10, detailed below, providing dampening means to dampen the frame 16 from road borne loads sustained by the wheel axles 12, 12'.

Axles 12, 12' are interconnected by two pairs of transversely spaced, elongated, rigid panels 20a, 20b and 22a, 22b, which are anchored in pairs to the axles by bolts 24. To the inner edges of each top horizontal panel 20a, 22a is anchored in upright position an elongated wall 26, 28, respectively. Walls 26, 28 bridge axles 12, 12' as with flooring panels 20a-20b and 22a-22b. Reinforcing struts 30, triangular in cross-section, are anchored to the top surface of top flooring panels 20a, 22a and to the exterior face of upright walls 26, 28 to firmly anchor the latter to the former. The upright walls 26, 28 are interconnected at their top ends, at selected intervals, by cross-beams 32.

In accordance with the teachings of the invention, each wall 26, 28 carries at the exterior face of its top edge section —coplanar with cross-beams 32—a plurality of lengthwisely spaced, short sleeve blocks 34, 36 respectively. Sleeve blocks 34 and 36 taper slightly exteriorly toward wheels 14a, 14b respectively. Sleeve blocks 34 define a first coaxial, common, lengthwise channel 38, and sleeve blocks 36, a second coaxial, common, lengthwise channel 40 parallel to channel 38.

A large bottom side beam 42 of vehicle frame 16 extends between wheel 14a and upright wall 26 parallel to the latter, while another large side beam 44 of vehicle frame 16 extends between wheel 14b and wall 28 parallel to the latter. A plurality of sleeve blocks 46, 48 are anchored to the interior face of corresponding cross-sectionally quadrangular beams 42, 44 respectively, in lengthwisely spaced fashion.

Figures 3, 4:
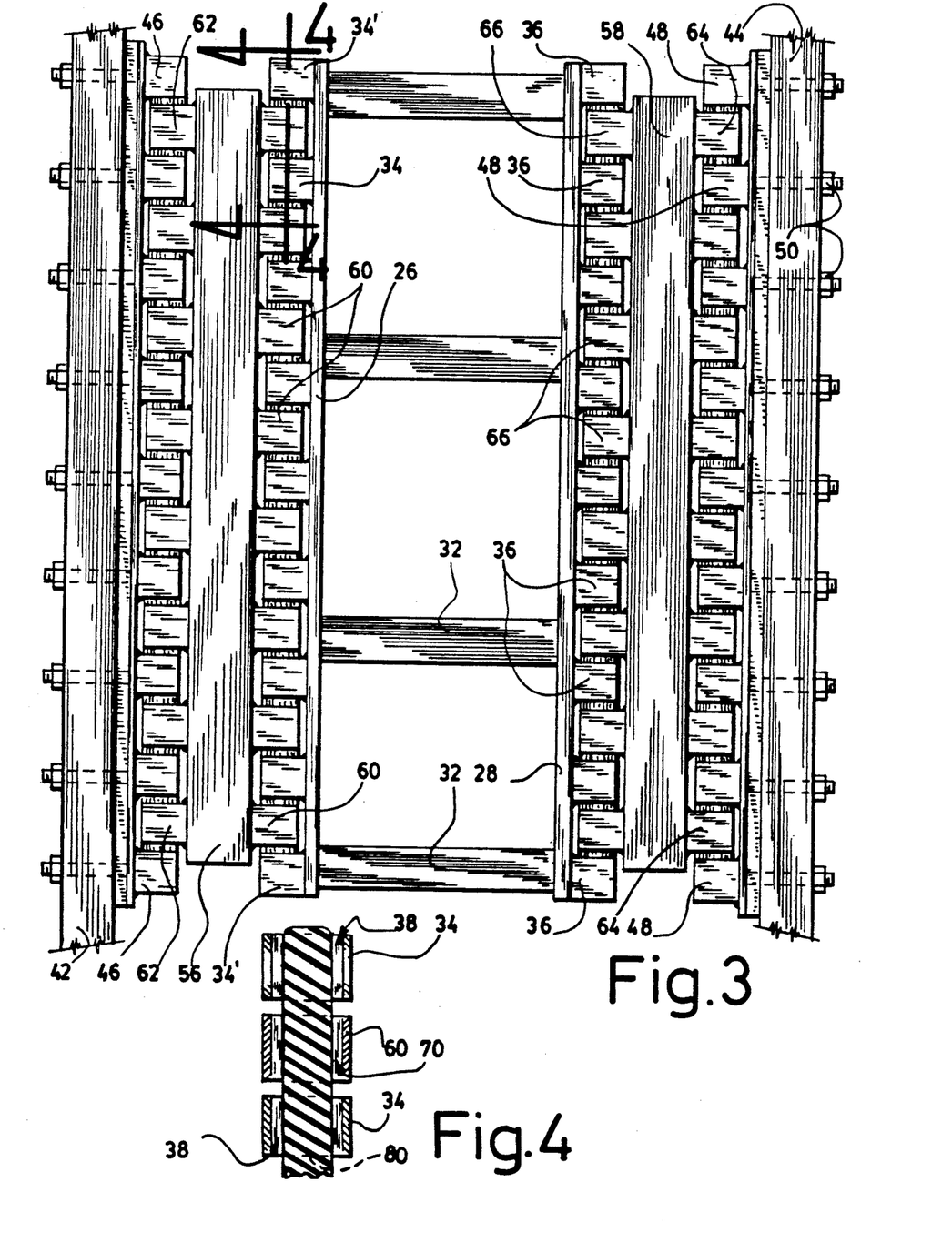
FIG. 3 is a top plan view from perspective 3 of FIG. 1.
FIG. 4 is a cross-section of the suspension system taken along line 4—4 of FIG. 3.

Preferably, each block 46, 48 is anchored to its corresponding beam 42, 44 by a large through-bolt 50. Sleeves 46, 48 are similar to sleeves 34, 36, tapering inwardly and defining lengthwise coaxial channels 52, 54 respectively. Each pair of sleeves 34, 46 are to come in planar facing register with one another, and similarly with sleeves 36, 48, as clearly illustrated in FIG. 3.

Accordingly with the heart of the invention, two cross-sectionally quadrangular, lengthwise, elongated suspension beams 56, 58 are mounted between frame beam 42 and wall 26, and between frame beam 44 and wall 28, respectively. Each beam 56, 58 includes on both opposite lateral sides thereof a plurality of sleeve blocks 60, 62 and 64, 66 respectively. Blocks 60, 66 taper away from their beam 56, 58 and are of a shape similar to sleeve blocks 34, 36 and 46, 48. Each sleeve 60, 62 64 or 66 is so spaced from the corresponding proximate sleeves 60, 62, 64, 66 respectively as to be able to freely engage the corresponding cavity defined between successive pairs of sleeve blocks 34—34, 46—46, 48—48 or 36—36, respectively. Sleeves 60, 62, 64 or 66 also define lengthwise coaxial channels 70, 72, 74 or 76 respectively.

A first elongated elastomeric stud 80 extends through the intersecting area of channels 38 and 70 to secure corresponding interdigitated sleeves 34 and 60 with one another. A second elongated elastomeric stud 82 extends through the intersecting area of channels 52, 72, to secure corresponding interdigitated sleeves 46, 62 with one another. A third elongated elastomeric stud 84 extends through the intersecting area of channels 54, 74, to secure corresponding interdigitated sleeves 48, 64. The fourth elongated elastomeric stud 86 extends through the intersecting area of channels 40, 76 to secure corresponding interdigitated sleeves 36, 66. Each elongated stud 80-86 is cross-sectionally quadrangular, in its unstressed condition, but, as a consequence of the load sustained from frame beams 42, 44 against wheel axle supports 26, 28, the stud will deform into a pentagonal shape in cross-section as clearly illustrated in FIG. 2. The cross-sectionally pentagonal shape of studs 80-86 is in turn defined by the particular interdigitating arrangement of the sleeves assembly 34 and 60, 46 and 62, 48 and 64, and 36 and 66.

More particularly, the top legs of each one of the two opposite, laterally outward pairs of sleeve blocks 46, 62 and 48, 64 have an "x" configuration in end view (FIG. 2) whereas the bottom legs thereof are substantially coplanar. Similarly, the bottom legs of each one of the two opposite, laterally inward pairs of sleeve blocks 34, 60 and 36, 66 have an "x" configuration in end view, whereas the top legs thereof are substantially coplanar.

It can now be understood that each side from the wheel axles support frame 26, 28 is suspended from a corresponding vehicle body beam 42, 44 respectively, through a double piano hinge suspension system 10.

Indeed, since hinge studs 80–86 are made from an elastomeric material—e.g. rubber or polyurethane—, they will sustain torsional, compressive loads when the road-going vehicle frame 16 sustains road-borne loads, thus dampening the vertical displacement of the wheel axles frame 26 or 28 relative to vehicle frames 42 or 44 associated with load-inducing road conditions.

Figure 5:
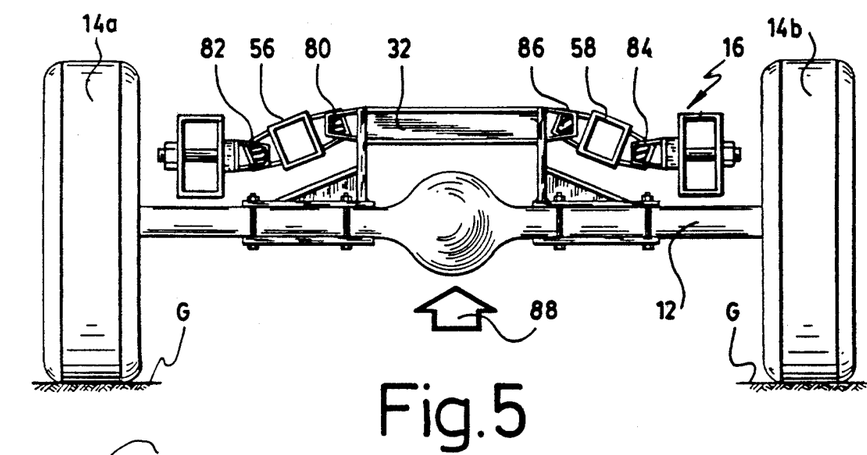
FIGS. 5-6 are views similar to FIG. 1, but at a reduced scale, suggesting how the suspension system reacts to various loads during road-going conditions.
Figure 6:
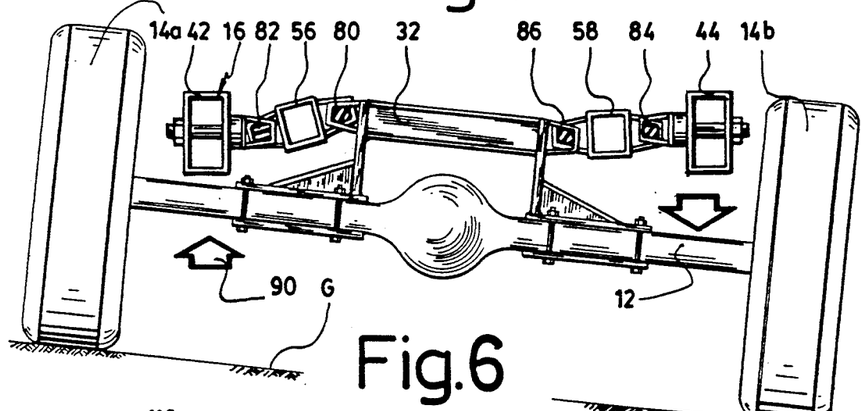

This is suggested in FIGS. 5–6 of the drawings. In FIG. 5, both wheels 14a, 14b sustain a road-bump whereby all the axle 12 is lifted (wide arrow 88). Frame will be thus allowed to sink, wherein beams 56, 58 will pivot about associated pivot hinge studs 80, 82 and 84, 86 respectively—which sustain deformation during the process—. This is to say, each pair of interdigitating sleeve blocks surrounding the corresponding hinge studs will rotate relative to one another. In FIG. 6, left side wheel 14a sustains a road bump but not the right side wheels 14b, whereby only the left portion of wheel axle 12 is lifted (wide arrow 90). Right side frame beam 44 will accordingly lift reactively by pivoting about hinge stud 86—which deforms during the process—, while laterally opposite frame beam 42 will remain substantially at the same relative distance above axle 12.

Frame elements 42–44, beams 56–58 and hinge studs 80–86 remain above axle 12 at all times, whatever the road conditions.

Preferably, each elongated rubber shaft 80–86 includes a pair of cross-sectionally U-shaped elongated ironbars 94, 94′ edgewisely carrying the opposite lateral edge portion thereof. Bars 94, 94′ are of substantially the same length as their corresponding stud 80–86. Each deformable rubber stud 80–86 is advantageously at least partially melted before edgewise engagement by the flanking pair of iron beams 94, 94′, whereby the latter may become an integral part of the former by physically merging therewith: the partly liquefied rubber will come to enclose the rigid beams 94, 94′ and upon cooling, will solidify once again. It is understood that the U-beams 94, 94′ of a given rubber shaft will remain spaced from one another as suggested in FIG. 2, and will conformingly engage through the corresponding intersecting areas of the corresponding huge channels 52, 72; 38, 70; 40, 76; or 54, 74, by abutting against (and preferably be welded to) the mating, cross-sectionally U-shape free end portions of interdigitating fingers 46, 62; 34, 60; 36,66; or 48, 64 respectively.

Hence, each pair of rigid U-beams 94, 94′ and their corresponding rubber stud 80–86 constitute a substantially cross-sectionally square cross-section. U-beams 94, 94′ positively protects frangible studs 80–86 against shearing forces applied by the interdigitating fingers during relative movement of frames 42 or 44 about wheel axle 12. The U-beams and the rubber studs therefore cannot accidentally release the hinges, and the interspacing of successive sleeve blocks remains constant.

The present vehicle suspension system 10 may be installed at both the front or rear of a vehicle such as a farm tractor, a skidder, etc . . . —no springs or bushings are required—.

Figure 7:
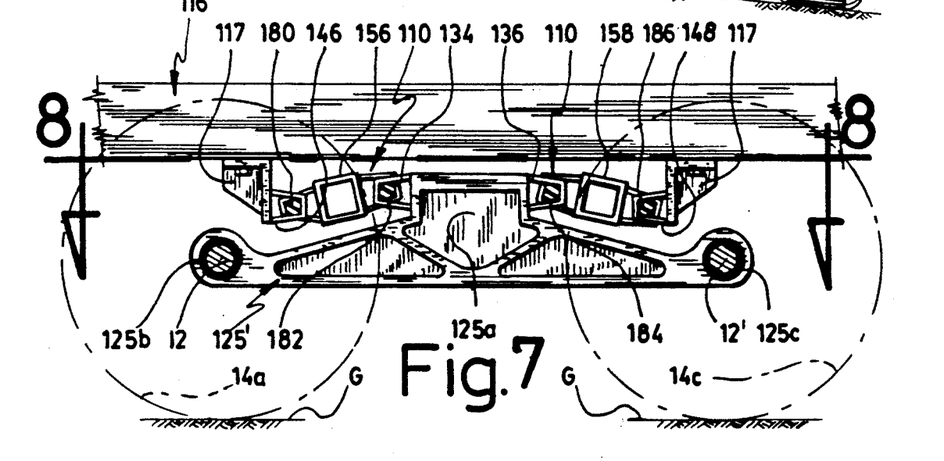
FIG. 7 is a partly schematic side elevation of the vehicle suggested in FIG. 1, but with the wheels shown in phantom lines and illustrating an alternate embodiment of the invention.
Figure 8:
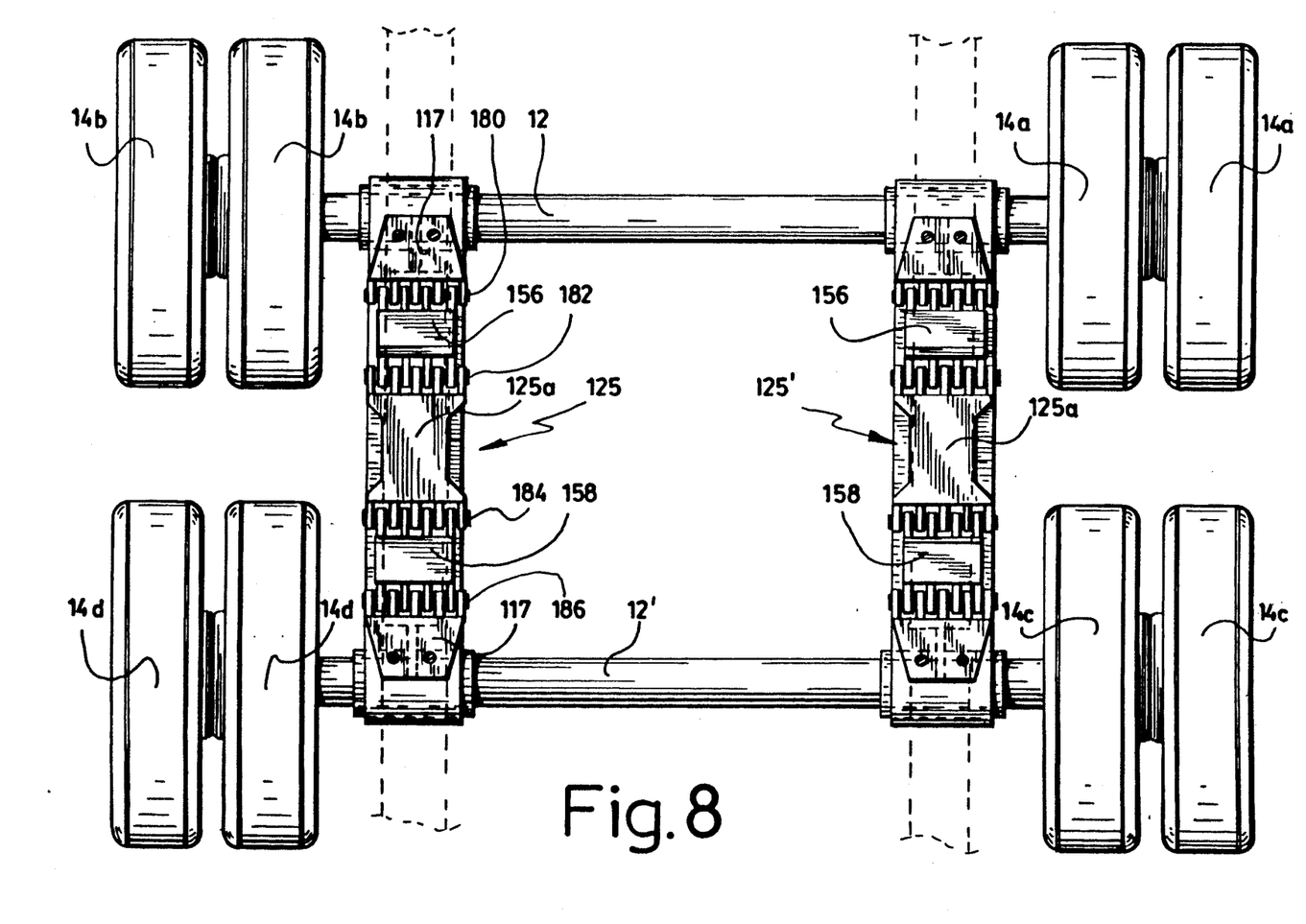
FIG. 8 is a top plan view thereof taken about lines 8—8 of FIG. 7.

A second embodiment of suspension system of the invention is shown in FIGS. 7–8 as 110. Suspension 110 is to be positioned transversely of a two-axle truck, to replace the usual tandem wheels. In suspension 110, beams 156, 158 and associated elastomeric hinge studs 180–186 extend transversely of frame 116, rather than lengthwisely thereof, and below frame 116, rather than above same. Opposite outer end sleeve blocks 146, 148 of suspension assembly 110 are anchored to the underface of the structural side beams of vehicle frame 116, via brackets 117. Opposite inner ends sleeve blocks 134, 136 are in turn anchored to the top intermediate portion 125a of each of the pair of two-wheel axle link frames 125, 125′. Each link frame 125, 125′ includes two transverse through-bores 125b, 125c at its opposite ends, for rotating engagement by the end segments of axles 12, 12′.

It is understood from FIGS. 5–6 that, as hinges 80–82 or 84–86 yield to road-borne loads—transmitted to axle 12 by wheels 14—, the vehicle body frame beams 42, 44 will be compelled in translational motion both about a vertical axis—moving toward to or away from underlying wheel axle 12—as well as about a horizontal axis parallel to axle 12—i.e. moving towards to or away from the wheels 14a, 14b.

More particularly, as a frame beam, say beam 44, is raised by the pivotal action of its double piano hinge system 84, 86, it concurrently moves towards its proximate wheel 14b, as shown on the right side of FIG. 6. This is because, as frame 44 becomes colinear to elements 86, 58, 84, from an initial, relatively inclined position, the effective horizontal length of the combined elements 44, 86, 58, 84 is slightly increased.

Similarly, as another frame beam, say 42, is lowered by the pivotal action of its double piano hinge system 10 it concurrently moves away from its proximate wheel 14a, as illustrated at the left side of FIG. 6. This is because the relative inclination between frame beam 42 and elements 82, 56, 80 does increase, thus slightly decreasing the effective horizontal length of the combined assembly of elements 42, 82, 56, 80. In both instances, frame beams 42, 44 will remain positively horizontal, as is desirable for load stability in road conditions.

It is understood that, as one vehicle chassis beam 42 or 44 is lifted by its double piano-hinge pivot assembly, that leading side (i.e. that side encountering the upward lift of the registering wheel axle end portion) of the vehicle body is reactively lowered while the trailing side of the vehicle body is concurrently lifted. Thus, the weight itself of that vehicle body part will desirably bias the present suspension system to return the trailing side of the vehicle body to its initial lowered condition. Therefore, such a feature increases the natural stability of the vehicle in road-going conditions and consequently, the safety of its handling.

It is understood that with the present suspension system, there is no need for installing bushings or springs to prevent the vehicle body from becoming inclined when the vehicle encounters road surface irregularities, as was the case for prior art suspension systems, due to the above-noted feature of the vehicle body weight that downwardly biases the trailing side thereof that has lifted reactively to the sinking of the leading side of the vehicle body.

Figure 9:
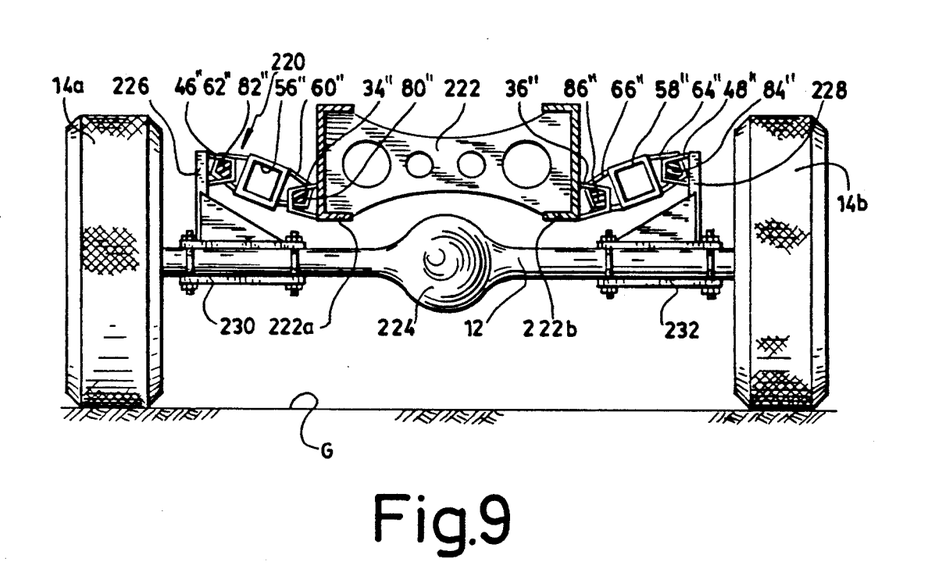
FIG. 9 is a front elevational view similar to FIGS. 1 and 5, but illustrating another embodiment of vehicle suspension system according to the invention.

The alternate embodiment of suspension means, shown in FIG. 9 and referenced 220, is similar to the suspension means of FIG. 1. Yet, the cross-beam 222 now freely overlies the enlarged differential gear housing 224 at the intermediate section of (non-rotating) wheel axle 12, parallel to wheel axle 12, rather than being anchored to the latter by vertical arms 26, 28 as in the embodiment of FIG. 1. Central cross-beam 222 constitutes the single bottom supporting frame member of the vehicle box, and thus, no distal vehicle box frame members (42 and 44 in FIG. 1) is present. On the other hand, the distal ends of the two laterally opposite suspension means, at 46″, 48″, are anchored (e.g. by bolting means or alternately, by welding means) to registering sections of axle 12 via transverse (vertical) arms 226 and 228 and associated axle braces 230, 232 respectively; while the proximal ends of suspension means, at 34″, 36″, are both anchored (e.g. again by bolting means or alternatively, welding means) to the same, single, intermediate cross-beam 222 at opposite, bottom corner edge portions thereof, 222a, 222b.

Hence, cross-beam 222 is free to move vertically over the enlarged central differential housing of the wheel axle, between:

(a) a lowermost, limit position—illustrated in FIG. 9—where the suspension beams 56″, 58″, are downwardly inwardly inclined and the elastomeric studs 80″-86″ are compressively squeezed (under the load of the cross-beam 222) by the four pairs of interdigitating sleeve blocks 46″, 62″; 34″, 60″; 36″, 66″; and 48″ 64″; through (b) an intermediate position, in which one suspension beam 56″ or 58″ is oriented generally horizontally and the corresponding pair of elastomeric studs 80″, 82″; or 84″, 86″, loosely engage the interdigitating sleeve blocks 46″, 62″, and 34″, 60″, or 36″, 66″, and 48″, 64″, in uncompressed fashion; and (c) an uppermost position, in which the suspension beam 56″ or 58″ is upwardly inwardly inclined and the elastomeric studs are compressively squeezed (as in (a) above).

The non circular cross-section of elastomeric studs prevent them from rotating through the interdigitating sleeve blocks; rather, they will deform and twist under the load bias. The studs should never rotate, and in view thereof, they will further be preferably glued to the interdigitating sleeve blocks they extend through.

Figure 10:
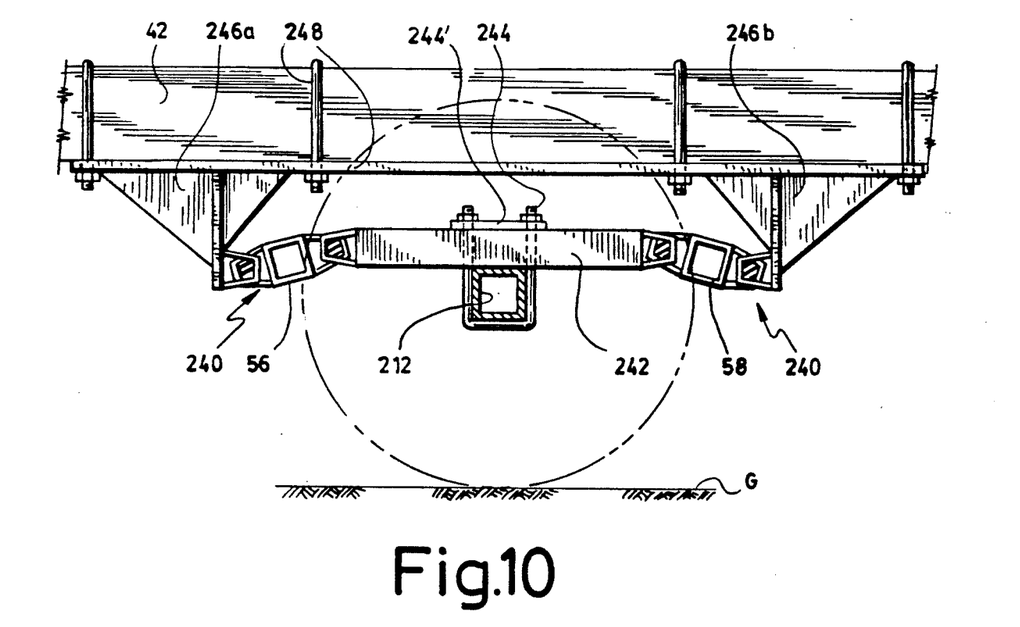
FIG. 10 is a partial lateral side elevational view of a vehicle provided with another embodiment of suspension means, and showing in the background a vehicle wheel in phantom lines.

In the embodiment of FIG. 10, the pair of suspension means 240 are spaced along the longitudinal axis of the vehicle, rather than transversely as suspension means 220. (Suspension 220 controls the vehicle rolling motion, suspension 240, the vehicle's pitch motion).

In FIG. 10, suspension beams 56 and 58 are articulated at the front and rear ends of an integral, elongated bar 242. Bar 242 sits about an intermediate section thereof transversely over non rotating axle wheel 212, and is fixedly anchored thereto by braces 244. In turn, the front and rear ends of suspension beams 56 and 58 are articulated to front and rear bracket members 246a, 246b, that downwardly depend from the vehicle lengthwise frame beam 42 and are anchored thereto by connectors 248. As in FIG. 9, the sleeve blocks that come in interdigitating engagement with the suspension beams 56 and 58, are either welded or bolted to the vehicle frame bracket members 246a, 246b.

Figure 11:
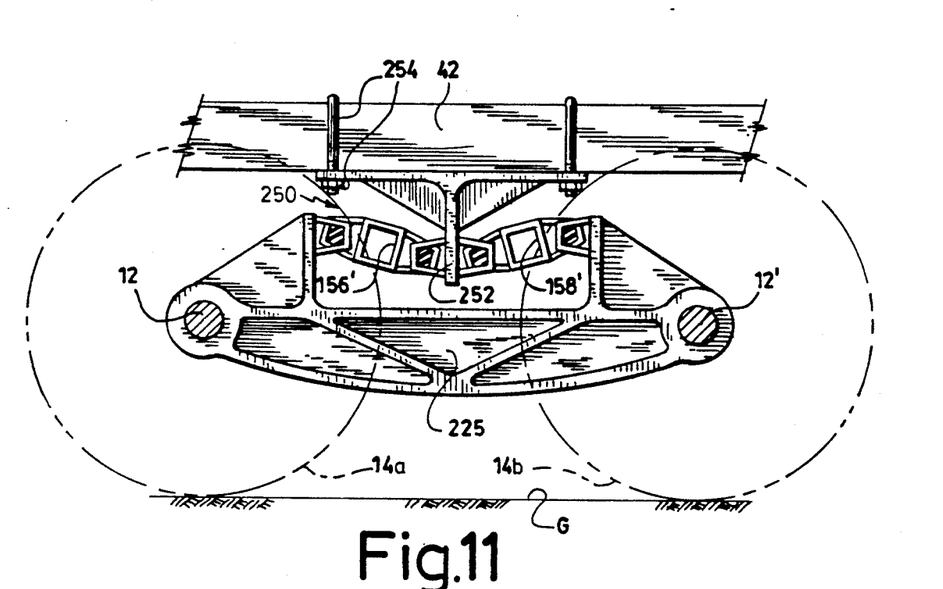
FIGS. 11 and 12 are lateral side elevational views similar to FIG. 7, but for two other tandem-type suspension systems.

The embodiment of suspension 250 in FIG. 11 is similar to suspension 110 in FIG. 7, again for tandem wheels. However, the way the suspension beams 156′ and 158′ are articulated, is inverted. Namely, the elongated bar or link frame 225 fixedly interconnecting a pair of successive, fore and aft wheel axles 12, 12′, is now of U-shape (rather than the inverted T-shape frame 125 of FIG. 7), and is articulated now to the distal ends of the pair of fore and aft suspension beams 156′ 158′. The proximal ends of suspension beams 156′, 158′ are now articulated to a single rigid arm 252, downwardly depending from frame 42 and anchored thereto by connectors 254 and located intermediate wheels 14a and 14b.

Figure 12:
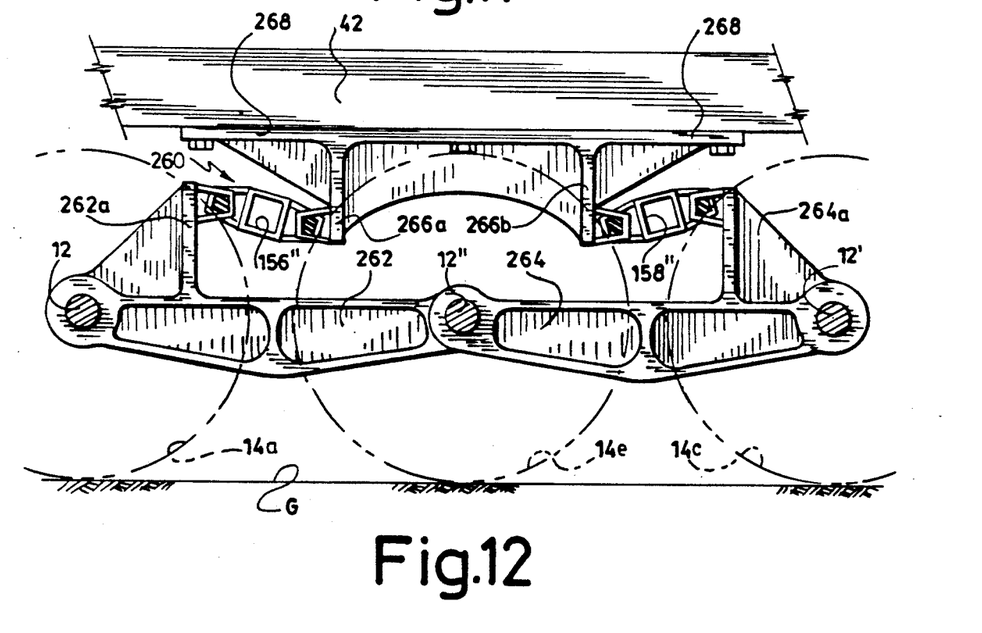
Figure 13:
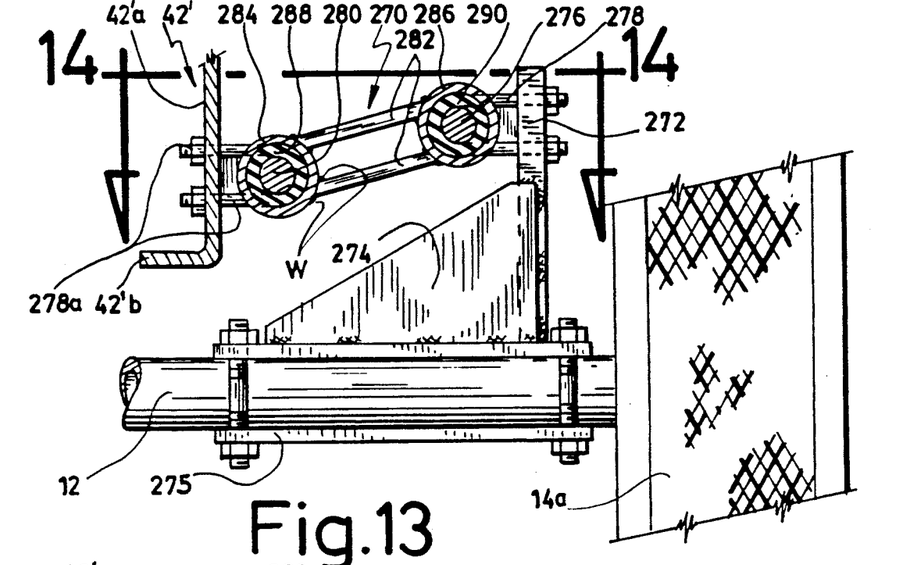
FIG. 13 is an enlarged, partial, front elevational view of still another suspension system.
Figure 14:
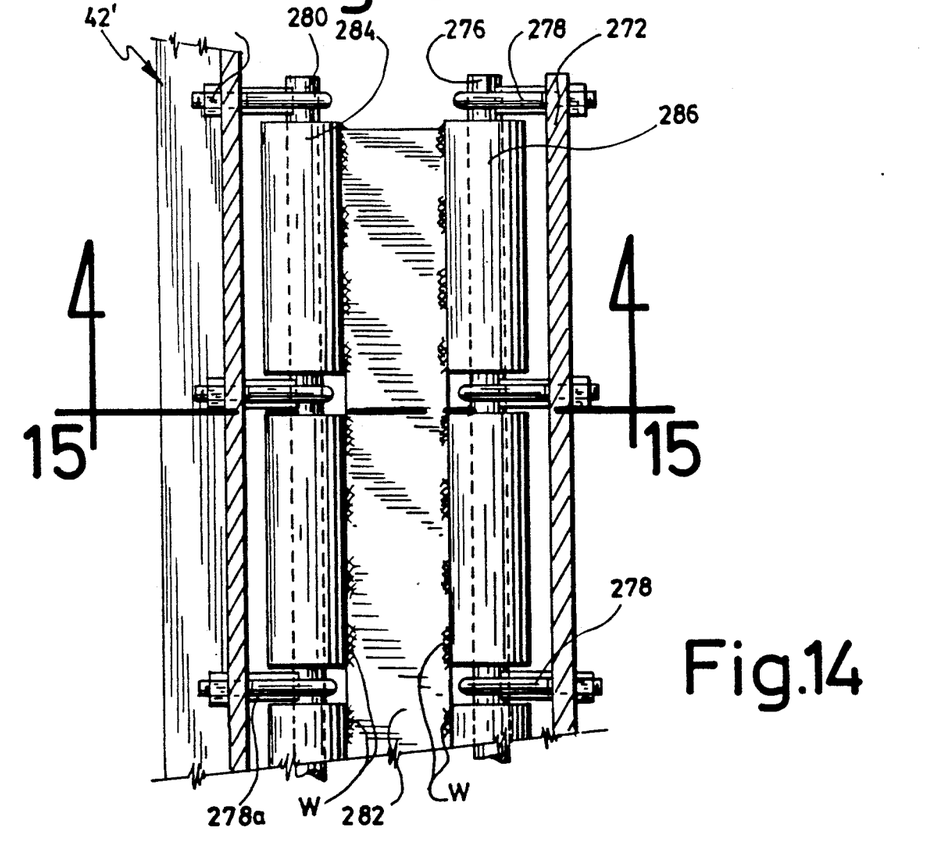
FIG. 14 is a partial, top plan view of the elements of FIG. 13, taken from perspective 14—14 of FIG. 13.
Figure 15:
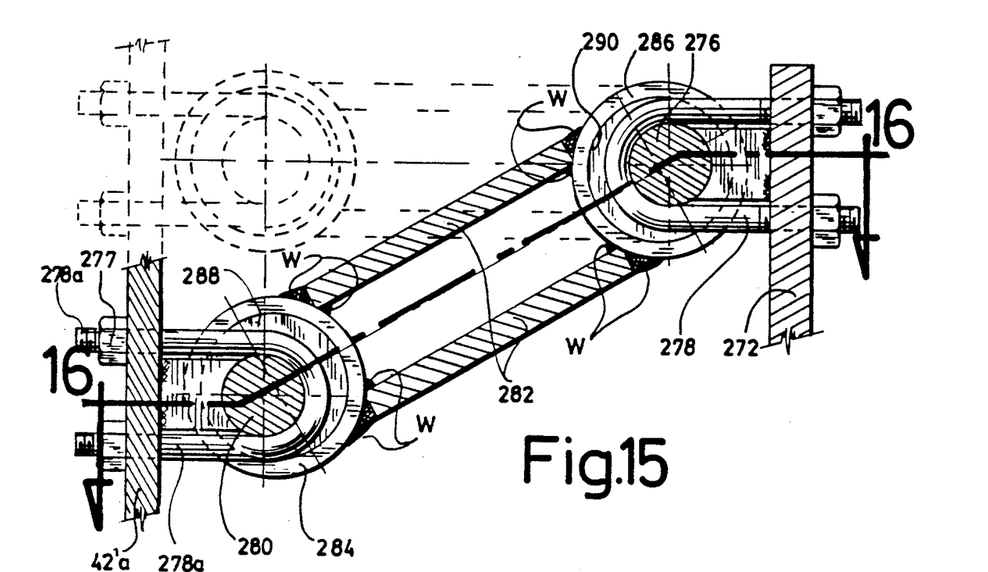
FIG. 15 is a cross-section at an enlarged scale along line 15—15 of FIG. 14.

The embodiment of suspension 260 in FIG. 12 is similar to that of FIG. 11, but for the fact that the single, integral, wheel axle link frame (225 in FIG. 11), has now been replaced by two L-shape link frames 262, 264. Both link frames 262, 264, are pivoted around an intermediate wheel axle 12″; front frame 262 is pivoted at its front end to front wheel axle 12; and rear frame 264 is pivoted at its rear end to rear wheel axle 12′. The suspension beams 156″, 158″, are articulated at their distal ends to the front and rear upright legs 262a, 264a of L-shape link frames 262, 264; while the proximal ends of suspension beams 156″, 158″, are articulated to two lengthwisely spaced vertical arms 266a, 266b, downwardly depending from vehicle frame 42 and anchored thereto by common brace member 268. Brace member 268 will provide sufficient clearance relative to intermediate axle 12″ and associated pivoted ends of link frame 262, 264, to prevent contact therebetween during relative vertical motion of wheels 14a, 14c, 14e.

Still another embodiment of vehicle suspension is illustrated in FIGS. 13–16 and referenced as 270. The fixed horizontal axle 12—which rotatably carries wheels 14a at both ends—supports an upright panels 272, being anchored thereto by brace member 274 spacedly proximate a corresponding wheel 14a. Upright panel 272 extends lengthwisely of substantially the whole vehicle length, and supports at its top end an inturned, horizontal, lengthwise, cylindrical shaft 276, anchored by a number of U-connectors 278. Hence, shaft 276 extends about an axis orthogonal to that of wheel axle 12. The vehicle box frame 42′ also carries a shaft 280 and U-connector assembly 278a similar to elements 276 and 278, but outturned from a vertical side wall thereof, 42′a.

A double, rectangular plate member 282 rotatably interconnects parallel, horizontal, cylindrical shaft 276, 280 through a number of hollow cylindrical ears 284, 286, carried edgewisely of—and anchored by e.g. welding W to—the two lateral side edges of double plate member 282. A number of annular elastomeric plugs 288, 290, are carried around each shaft 276 and 280, respectively, and within hollow cylindrical ears 284 and 286, whereby these plugs 288 and 290 are frictionally taken in sandwich between a shaft 276 and each corresponding one of ears 284, or between (and preferably, fixedly adhered by a glue compound to) shaft 280 and each corresponding one of ears 286. Each associated pair of ear 284 and plug 288, or ear 286 and plug 290, clear the proximate brace member 274. A piano hinge means is therefore defined.

Figure 16:
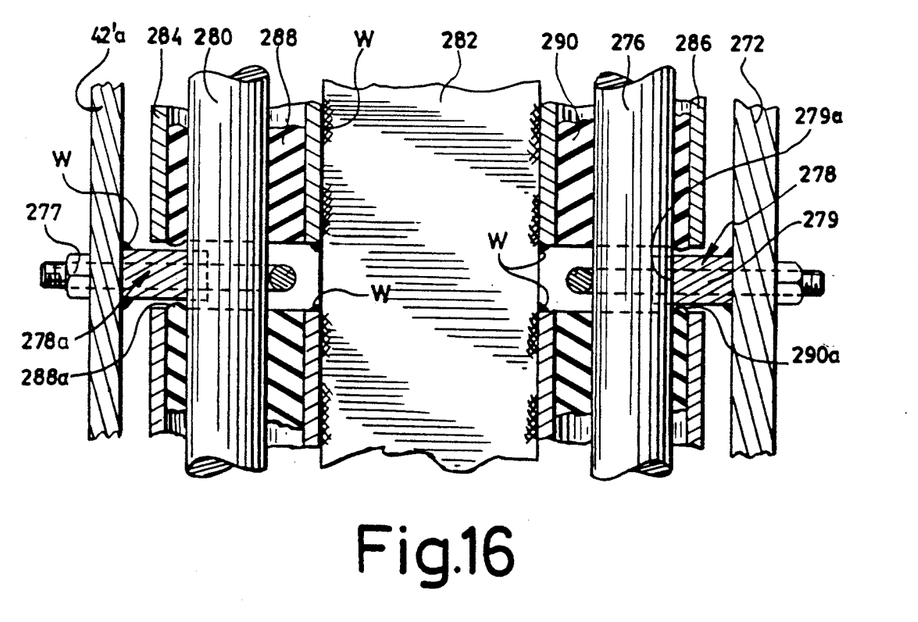
FIG. 16 is a sectional view taken along broken line 16—16 of FIG. 15.

Preferably, and as shown in FIG. 16, each cylindroid, hollow, rubber sleeve 288, 290, comprises a small axial bulge 288a, 290a, on its distal portion relative to double plate assembly 282. Also, each U-connector 278, 278a would advantageously consist of a U-shape, cross-sectionally circular, rigid rod, slidingly surrounding at its elbowed section (distal from the corresponding plate 42′a, 272) the corresponding shaft 276 or 280, and engaging by its two ends parallel bores made in corresponding walls 42′a or 272 and anchored in place by nuts 277. Seat blocks 279 are anchored at W to each plate 42′a and 272, and define an arcuate free edge 279a distal from corresponding plate 42′a or 272, this seat edge 279a again slidingly engaged around cylindrical shaft 276 or 280. Hence, each shaft 276, 280 is fully surrounded by a plurality of spaced annular members consisting of the combination of arcuate edge 279a of seat blocks 279 and the rod elbowed portion 278a; and the bulges 288a from two successive rubber plugs 288, 288, come in loose contact with the block 279 therebetween, to prevent axial play and rotation of the various short sleeves 284, 286 without preventing twisting deformation around shafts 280, 276.

Again, as with the prior embodiments of vehicle suspension, upon a torsional road-borne load being applied to suspension 270, rubber plugs 288, 290 will temporarily deform, yet will spring-back to their original condition upon release of the load. As clearly shown in FIG. 13, the unbiased orientation of double plate suspension frame 270 is to be inwardly, downwardly inclined, with the flooring 42'b of vehicle box frame 42' remaining spacedly above wheel axle 12.

Figure 17:
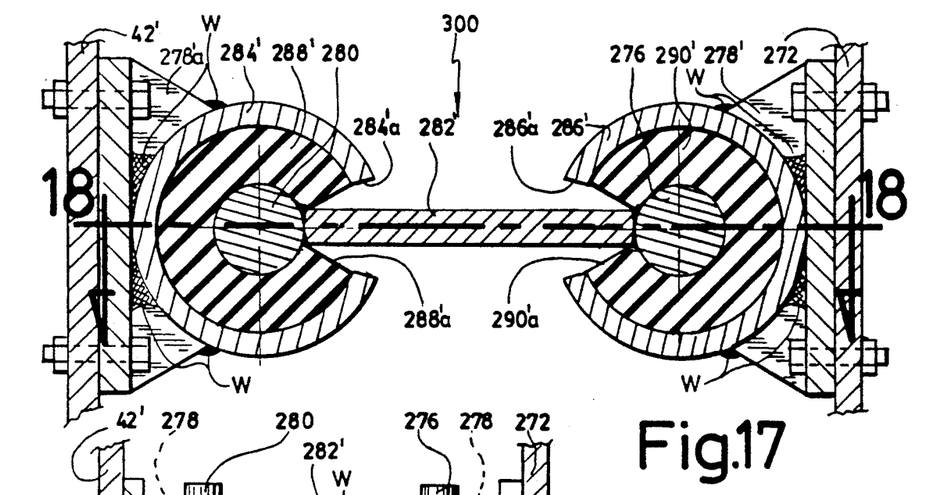
FIGS. 17 and 17a are views similar to FIG. 15, but for still another embodiment of vehicle suspension system according to the invention, and suggesting the dynamic play thereof under loading.
Figures 17A, 18:
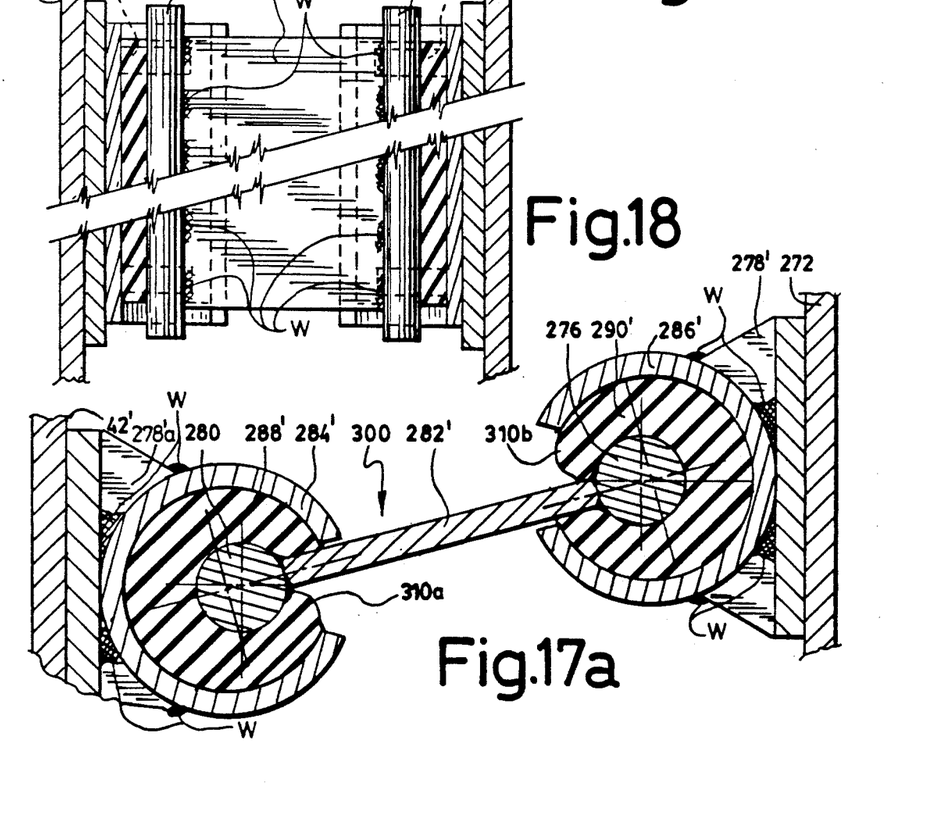
FIG. 18 is a cut-away sectional view along line 18—18 of FIG. 17.

The last embodiment of vehicle suspension is illustrated in FIGS. 17, 17a and 18 and referenced by 300. Suspension 300 is similar to suspension 270 in FIGS. 13–16. However, cylindrical ears 284', 286' (which are welded to brackets 278', 278'a) are now open at their inner side about mouths 284'a, 286'a so as to form a C-shape (FIGS. 17-17a). Elastomeric plugs 288', 290' are also radially slitted about slits 288'a, 290'a, register with mouths 284'a, 286'a, respectively. Slits 288'a, 290'a, are quadrangular in cross-section. A single plate 282' edgewisely engages at opposite lateral side edges through mouths 284'a, 286'a, and into slits 288'a, 290'a, to become edgewisely engaged thereinto and is welded edgewisely to shafts 276, 280 at W. Mouths 284'a, 286'a are wider than slits 288'a, 290'a, whereby upon a torsional load being applied on suspension 300, one plug 288' or 290' will deform and twist around its shaft 280 or 276 respectively so as to bring about a tilting motion of plate 282' as suggested in FIG. 17a.

In FIG. 17a, cylindroid plugs 288', 290', are shown slightly deformed each being provided with a small, radially outwardly projecting bulge 310a, 310b, projecting partially through mouths 284'a and 286'a. Bulges 310a and 310b form seats that will come to abut against the edges of mouths 284'a, 286'a, respectively, upon a torsional load being applied to suspension 300'. Hence, bulges 310a, 310b constitute limit means that limit maximum twisting deformation of rubber plugs 288', 290'. (The rubber plugs lever rotate, around the shaft or within the surrounding cylindrical tube in any of the present embodiments).

Polyurethane is the preferred elastomeric material for the deformable, spring-back plugs 80–86 and 288, 290 of the various alternate embodiments of present vehicle suspension system.

I claim:

1. A suspension system for use in dampening road-borne loads sustained by a vehicle having a chassis supported by a two wheel axle, said chassis defining first and second laterally spaced, lengthwise, bottom beams spacedly proximate the corresponding two wheels and located therebetween, said axle defining an intermediate section and first and second segments respectively extending between said intermediate axle section and the two wheels, said suspension system defining:
(a) first translational means, responsive to a lifting of said axle first segment and associated wheel by biasing said first beam from an initial normal position into a downwardly inwardly directed translational motion; and
(b) second translational means, responsive to said lifting of the axle first segment and associated wheel by biasing said second beam from an initial normal position into an upwardly outwardly directed translational motion;
wherein, upon the lifting force about said axle first segment being withdrawn, the weight of said vehicle about said second beam will automatically bias said vehicle second beam to return to its said initial position.

2. A suspension system as in claim 1, wherein each of said first and second translational means consists of a double piano hinge type assembly including two lengthwise, transversely spaced hinge members made from deformable material.

3. A suspension system as in claim 2, wherein said double piano hinge type suspension assembly consists of:
(a) a lengthwise rigid frame tube, having a plurality of first and second sleeve blocks on first and second opposite sides thereof;
(b) a plurality of third sleeve blocks, laterally inwardly depending from each vehicle beam, and interdigitating with said first sleeve blocks wherein one of said hinge members extend through said first and third sleeve blocks to pivotally interconnect said tube to the corresponding said beam;
(c) a support member, anchored to said axle intermediate section and projecting upwardly therefrom;
(d) a plurality of fourth sleeve blocks, laterally outwardly depending from said support member, and interdigitating with said second sleeve blocks wherein the other of said hinge members extend through said second and fourth sleeve blocks to pivotally interconnect said tube to said support member;
whereby, in normal road-going condition, said one hinge member is downwardly offset from said other hinge member.

4. A suspension system as in claim 3, wherein each said hinge member is an elongated, lengthwise, elastomeric compressible stud.

5. A suspension system as in claim 4, wherein said stud is generally quadrangular in cross-section in its normal condition, and further including a number of spaced annular bulges integral to said stud at successively equally spaced intervals, to maintain a gap in between each pair of successive interdigitated sleeve blocks being engaged therethrough by the stud.

6. A suspension system as in claim 2, wherein said double piano hinge type suspension assembly consists of:
(a) a lengthwise rigid frame member, having a plurality of first and second, hollow cylinders on first and second opposite sides thereof;
(b) a pair of first and second, full, cylindrical shafts, laterally outwardly depending from one and the other vehicle frame beams, respectively, and freely engaging a plurality of corresponding said first and second cylinders, to pivotally interconnect said corresponding said beam;
(c) a support member, anchored to said axle intermediate section and projecting upwardly therefrom;
(d) a plurality of fourth sleeve blocks, laterally outwardly depending from said support member, and interdigitating with said second sleeve blocks wherein the other of said hinge members extend through said second and fourth sleeve blocks to pivotally interconnect said tube to said support member;

whereby, in normal road-going condition, said one hinge member is downwardly offset from said other hinge member.

7. A suspension member for use in a road-going vehicle of the type having a chassis and a pair of two-wheel axles, said suspension member destined to movingly support said chassis spacedly over said wheel axles and defining:
   (a) a main, rigid frame, defining one and another opposite sides;
   (b) first connector means, for pivotally interconnecting said one side of suspension main frame to one portion of said vehicle chassis;
   (c) second connector means, for pivotally interconnecting said another side of suspension main frame to one portion of at least one of said wheel axles;
   (d) first resiliency means, cooperating with said first connector means in downwardly biasing said one side of suspension main frame and the associated said chassis one portion relative to said another side of suspension main frame, under the chassis weight load;
   (e) second resiliency means, cooperating with said second connector means in further downwardly biasing said another side of suspension main frame and the associated said chassis one portion relative to said another side of suspension main frame, under the bias of said first resiliency means;
   wherein, upon a road-borne load being applied to at least one of the vehicle wheel axles, said suspension main frame will tilt said chassis, from an initial position to a tilted position spacedly over said wheel axles, against the bias of said first and second resiliency means, while upon said road-borne load being released, said suspension main frame will automatically return said chassis to its said initial position under the spring-back bias of said first and second resiliency means.

8. A suspension member as defined in claim 1, wherein said first connector means consists of a first set of hollow ear members, destined to laterally inwardly depend from said one portion of vehicle chassis, and a second set of hollow ear members, destined to laterally outwardly depend from said one side of suspension main frame, and said first resiliency means is a first elastomeric stud, extending transversely of both said first and second set of ear members through a first channel means, whereby a first interdigitating interconnection is obtained therebetween; and said second connector means consists of a third set of hollow ear members, destined to laterally inwardly depend from said another side of suspension main frame, and a fourth set of hollow ear members, destined to laterally outwardly depend from an intermediate transverse extension of said wheel axles, and said second resiliency means is a second elastomeric stud, extending transversely of said third and fourth set of ear members through a second channel means, whereby a second interdigitating interconnection is obtained therebetween; said first and second interdigitating interconnections working in unisson; said first and second elastomeric studs being compressively twisted under said chassis weight load.

9. A suspension member as defined in claim 8, wherein said first and second channel means are each of a cross-sectional shape chosen from the group consisting of: polygonal, and circular, and said elastomeric stud resiliently conforming in cross-sectional shape to this said channel means cross-sectional shape.

10. A suspension member as defined in claim 1, wherein said one and another opposite sides of the suspension main frame are spaced about an axis transverse to said vehicle, said vehicle chassis to be located laterally inwardly of said suspension member.

11. A suspension member as defined in claim 1, wherein said one and another opposite sides of the main frame are spaced about an axis transverse to said vehicle, said chassis to be located laterally outwardly of said suspension member.

12. A suspension member as defined in claim 1, wherein said one and another opposite sides of the main frame are spaced about an axis lengthwise of said vehicle, said one portion of the vehicle chassis to register generally vertically above one said wheel axle, said one portion of wheel axle located at the top of an intermediate upright leg from an inversely T-shape tandem bar which integrally interconnects said pair of wheel axles.

13. A suspension member as defined in claim 1, wherein said one and another opposite sides of the main frame are spaced about an axis lengthwise of said vehicle, said one portion of the vehicle chassis to be located generally intermediate said pair of wheel axles, said one portion of wheel axle being located intermediate said one portion of the vehicle chassis and a corresponding one of said wheel axle.

14. A suspension member as defined in claim 1, wherein each said first and second connector means consists of a first set of single, cylindrical, shaft and plurality of hollow, cross-sectionally C-shape ear members surrounding the latter shaft, said first set of shaft and ear members being destined to laterally inwardly depend from said one and another portion respectively of vehicle chassis, and a second set of single, cylindrical shaft and plurality of cross-sectionally C-shape ear members surrounding said second shaft, said second set of shaft and ear members being destined to laterally outwardly depend from said on side of suspension main frame, and said first resiliency means consists of a number of cross-sectionally C-shape elastomeric studs, each one of said studs extending transversely of both said first and second set of ear members through a channel means, said channel means being defined in between each corresponding one of said ear members and associated said shaft from each said first and second sets thereof, each said cross-sectionally C-shape elastomeric stud defining a lengthwise mouth diametrally smaller than and coming in register with a corresponding lengthwise mouth defined by a corresponding said cross-sectionally C-shape ear member; each said first and second connector means further including a plurality of flat quadrangular plate members, each said plate member edgewisely engaging the opposite said mouths of a pair of laterally opposite said elastomeric studs of both said first and second sets of shafts for each one of said connector means, and fixedly anchored edgewisely to said shafts, and extending freely through said mouths of the corresponding said ear members, whereby said plate members laterally bridge the latter ear members; wherein each one of said first and second elastomeric studs frictionally engage both corresponding said ear members and associated shaft, and also becoming compressively twisted under said chassis weight load.

15. A suspension member as defined in claim 14, wherein each said cross-sectionally C-shape elastomeric stud further includes a radially outwardly extending lip, adjacent said mouth thereof, each said lip extending partially through said mouth of the corresponding said ear member, each said lip constituting dampening means to dampen pitch motion of the corresponding said plate member under road-borne loads.

* * * * *